March 6, 1928.  
J. R. ROGERS  
1,661,504  
TYPOGRAPHICAL COMPOSING AND DISTRIBUTING MACHINE  
Filed April 15, 1926    10 Sheets-Sheet 1

INVENTOR  
John R Rogers  
BY  
ATTORNEYS

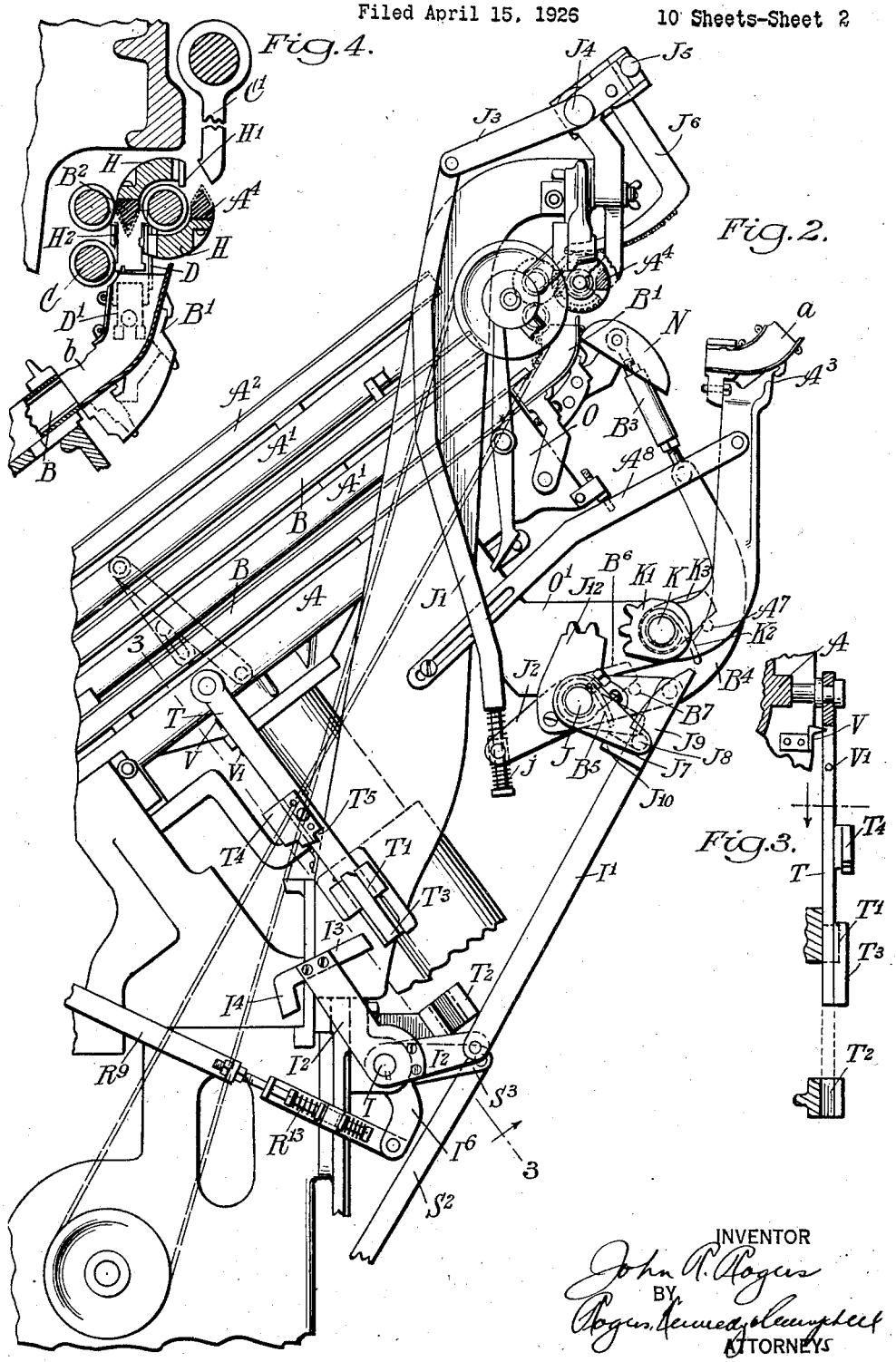

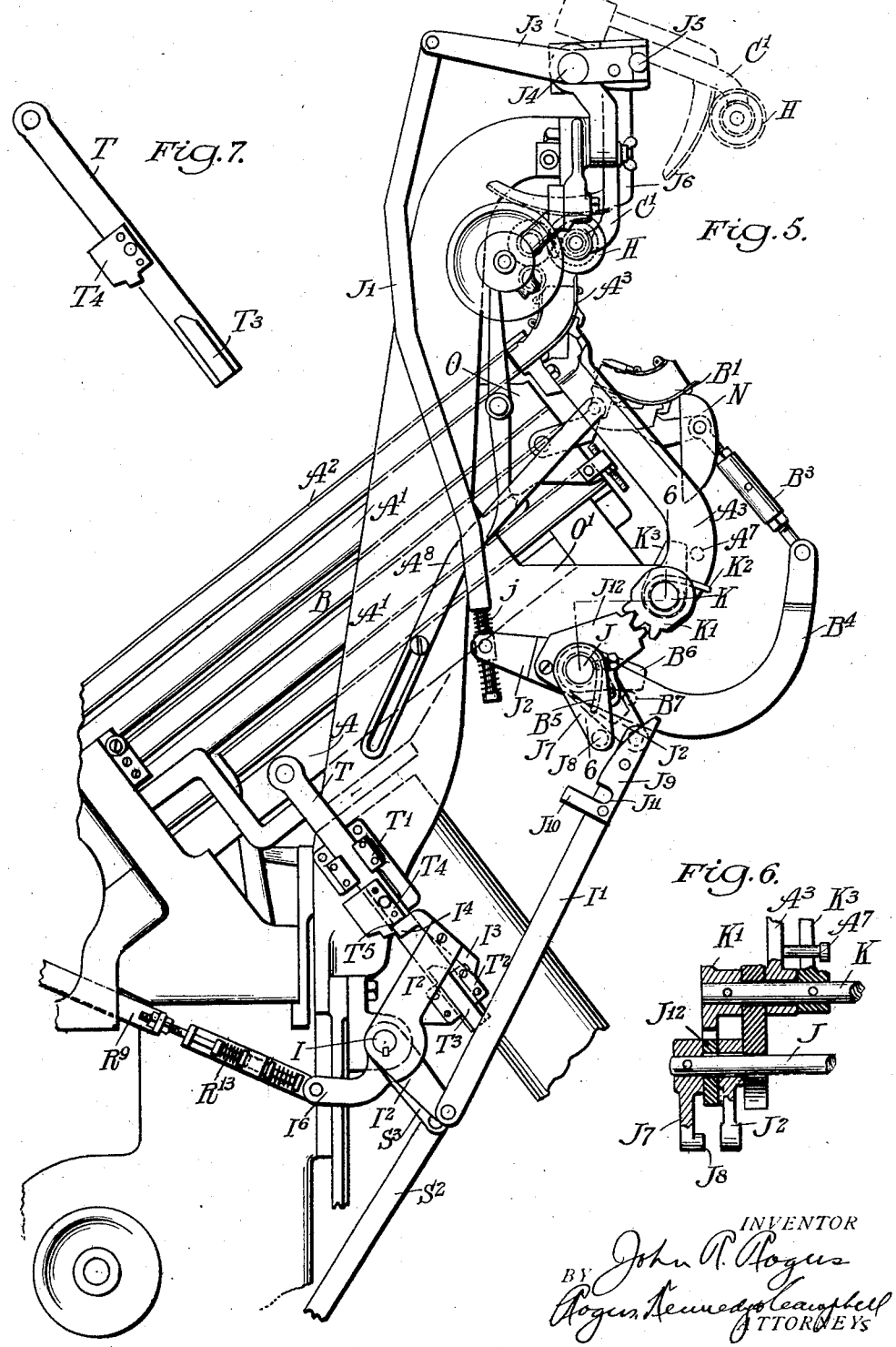

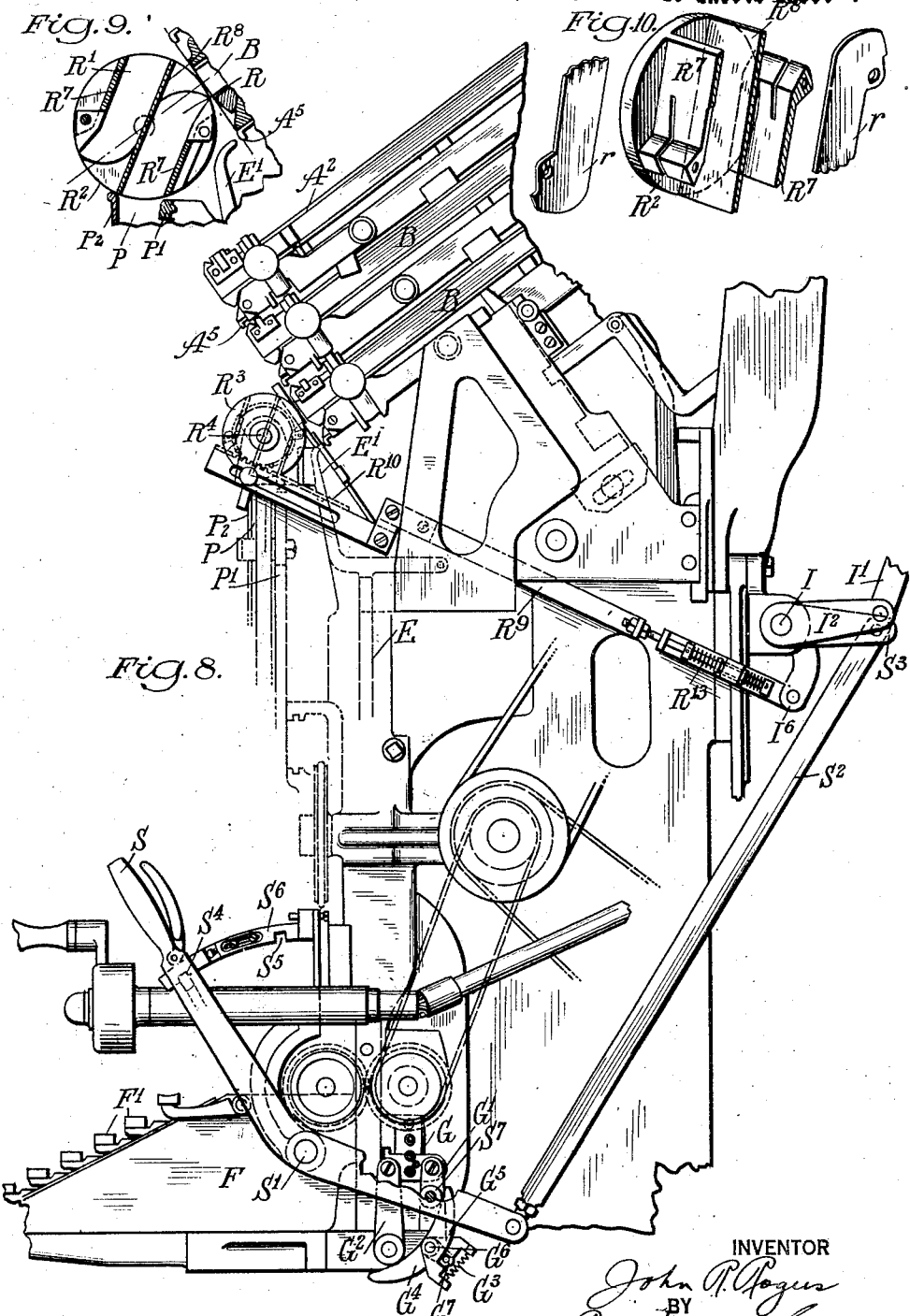

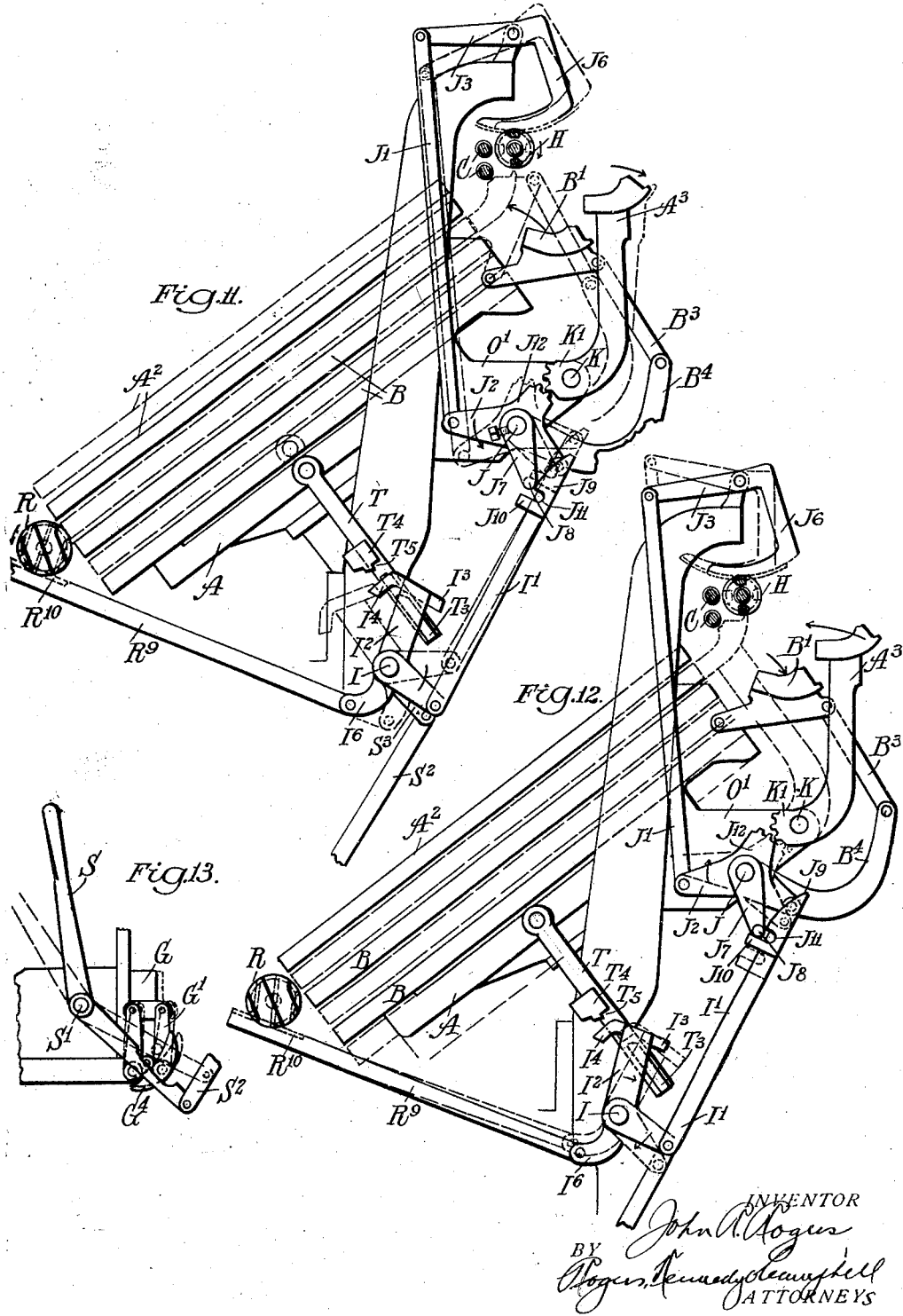

March 6, 1928. 1,661,504
J. R. ROGERS
TYPOGRAPHICAL COMPOSING AND DISTRIBUTING MACHINE
Filed April 15, 1926 10 Sheets-Sheet 6
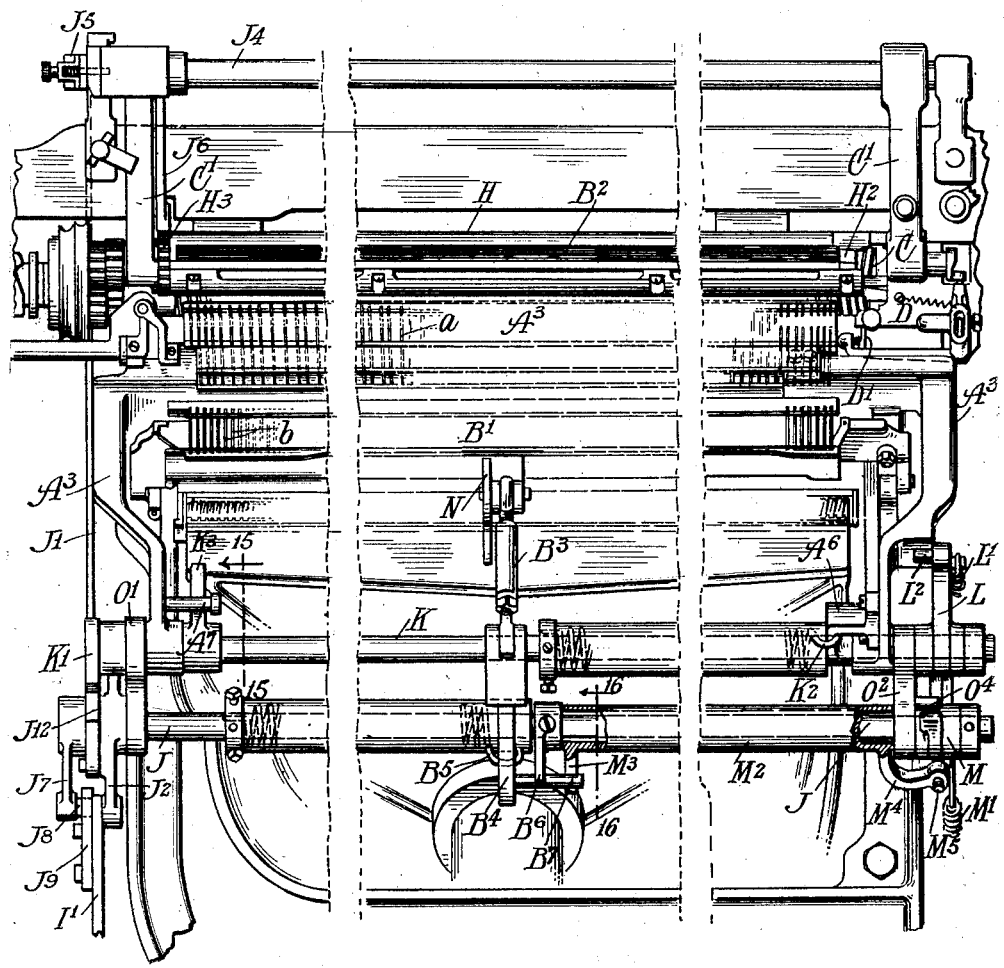
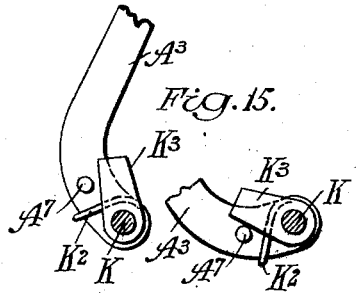
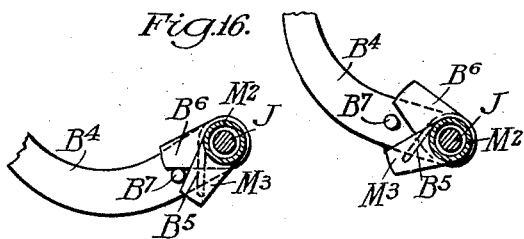
INVENTOR
John R. Rogers
BY Rogers, Kennedy Campbell
ATTORNEYS

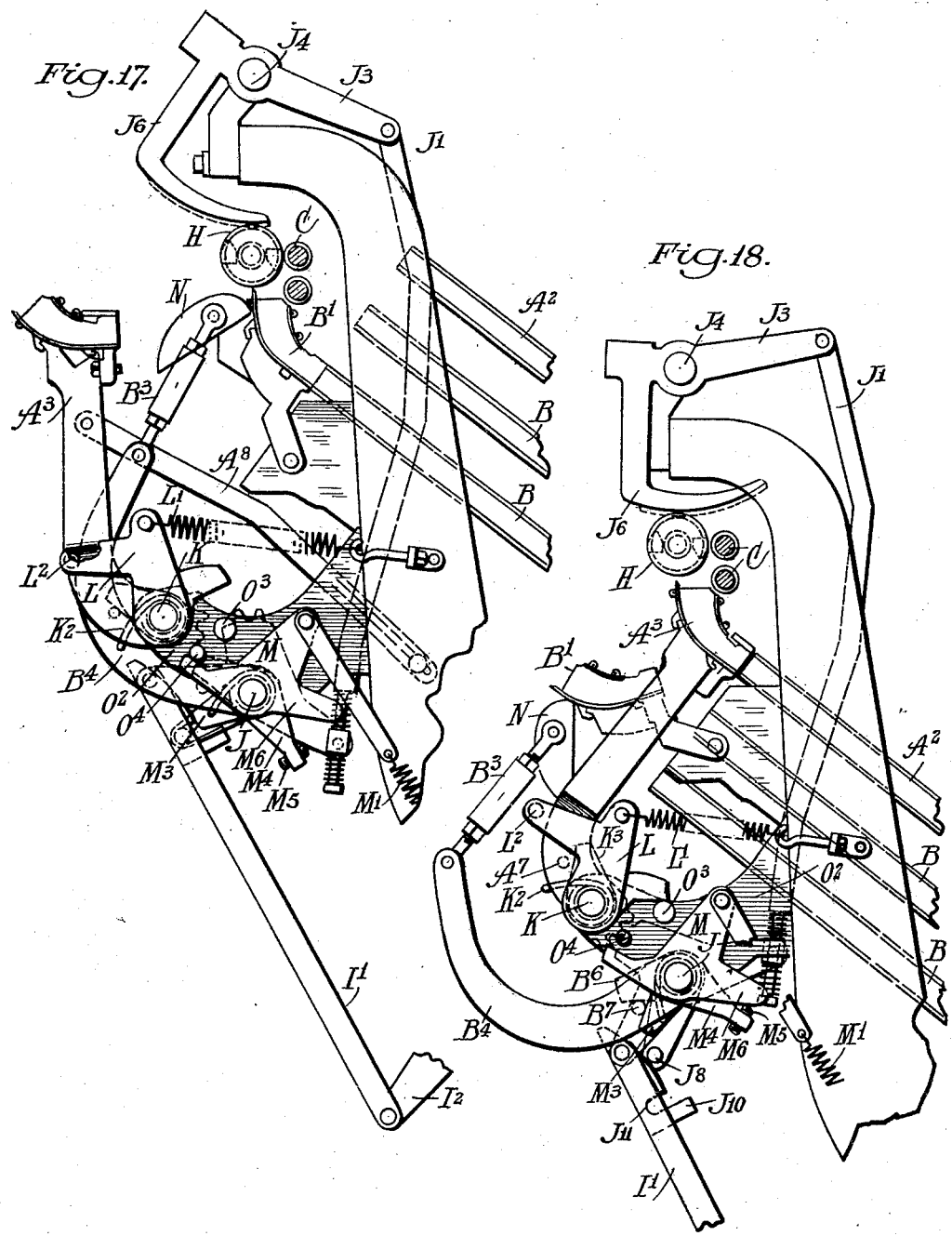

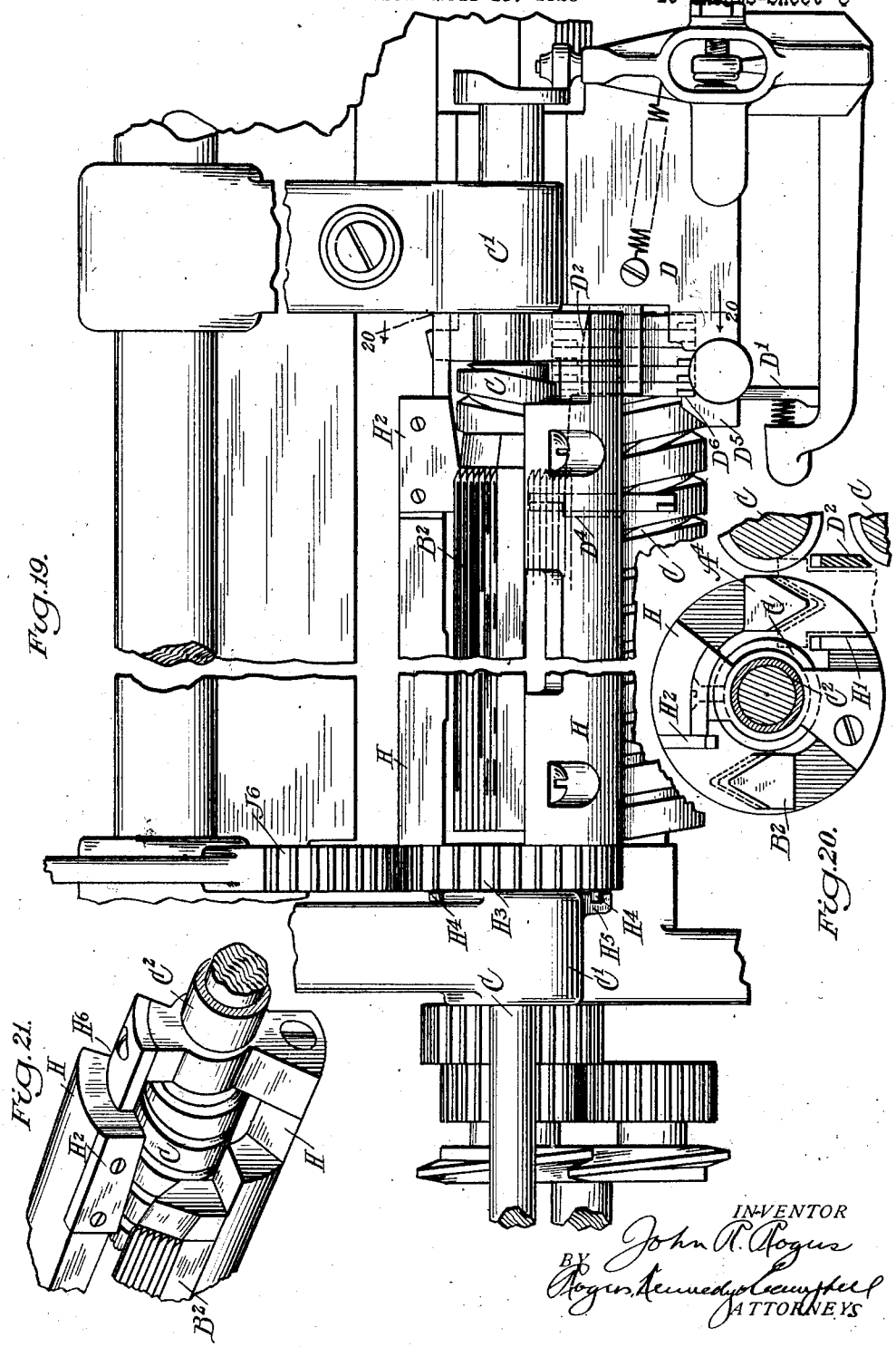

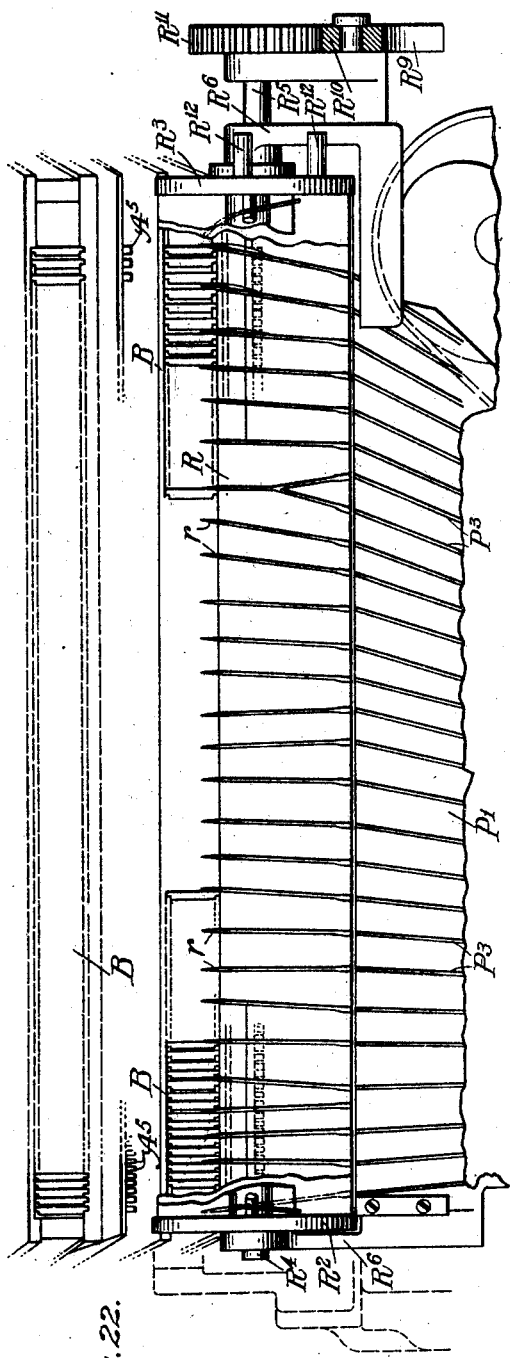
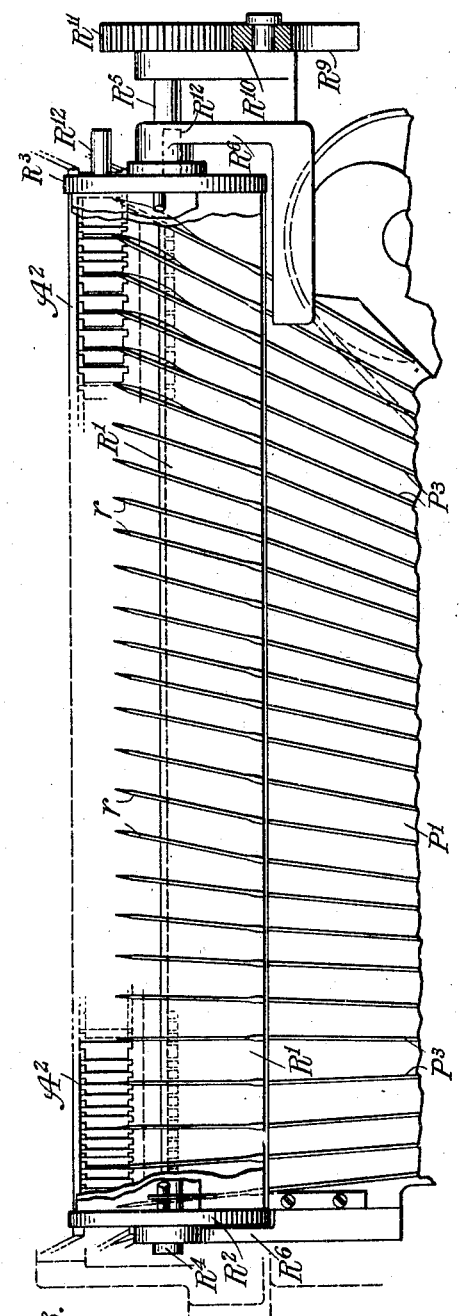

March 6, 1928.

J. R. ROGERS 1,661,504

TYPOGRAPHICAL COMPOSING AND DISTRIBUTING MACHINE

Filed April 15, 1926 10 Sheets-Sheet 10

INVENTOR.
John R. Rogers
BY
Rogers, Kennedy & Campbell
ATTORNEYS

Patented Mar. 6, 1928.

1,661,504

UNITED STATES PATENT OFFICE.

JOHN R. ROGERS, OF BROOKLYN, NEW YORK, ASSIGNOR TO MERGENTHALER LINOTYPE COMPANY, A CORPORATION OF NEW YORK.

TYPOGRAPHICAL COMPOSING AND DISTRIBUTING MACHINE.

Application filed April 15, 1926. Serial No. 102,107.

This invention relates to typographical composing and distributing machines, such as linotype machines of the general organization represented in Letters Patent of the United States to O. Mergenthaler, No. 436,532, wherein circulating matrices are released from a magazine in the order in which their characters are to appear in print and then assembled in line, the composed line transferred to the face of a slotted mold, the mold filled with molten metal to form a slug or linotype against the matrices which produce the type characters thereon, and the matrices thereafter returned through distributing mechanism to the magazine from which they started. More particularly, it relates to that class of machines (see, for instance, the Kennedy U. S. Patent No. 1,397,974) designed to handle matrix fonts which differ from one another in the size and number of characters, as, for example, the ordinary or ninety character fonts used for the composition of "straight matter", and the special seventy-two or fifty-five character fonts used for the composition of head letter or display matter.

The present invention provides a machine equipped with two interchangeable distributor bars, two interchangeable magazine entrances, and two interchangeable assembler throat sections, all differing as to form to correspond to the respective magazines, together with an adjustable keyboard mechanism serving under different conditions of adjustment to effect the release of corresponding matrices of the ordinary and display fonts. In the preferred embodiment illustrated, the interchange of the several parts and the adjustment of the keyboard mechanism are effected simultaneously, or at one operation, so as instantly to adapt the machine to an ordinary font or display font, as desired.

The exact construction and arrangement of the various parts will best be understood from the detailed description to follow.

In the accompanying drawings, the invention has been shown in connection with a shiftable multiple magazine machine, such as that characterized by the commercial Model 8 linotype, or as illustrated in the Rogers U. S. Patent No. 1,109,872, but they are equally applicable to machines of other kinds, including those equipped with a single magazine. In other words, the improvements are shown merely in preferred form and by way of example, and obviously many changes and modifications may be made therein without departing from its spirit. It is to be understood, therefore, that the invention is not limited to any specific form or embodiment, except in so far as such limitations are specified in the claims.

In the drawings:

Fig. 2 is a side elevation of the upper portion of the machine, showing the normal position of the parts when an ordinary magazine is in operative position;

Fig. 3 is a detail, fragmentary section, taken on line 3—3 of Fig. 2;

Fig. 4 is an enlarged vertical section taken through the distributor;

Fig. 5 is a side elevation, similar to Fig. 2, showing the normal position of the parts when a display magazine is in the operative position;

Fig. 6 is a detail section, taken on the line 6—6 of Fig. 5;

Fig. 7 is a detail of the safety bar;

Fig. 8 is a side elevation of the lower portion of the improved machine;

Fig. 9 is a vertical section taken through the assembler throat sections, showing the relation of the latter to the magazine in operative position;

Fig. 10 is a fragmentary perspective view, showing the construction of the throat sections;

Fig. 11 is an elevation, partly diagrammatic, showing by the full lines the parts in the act of being shifted to cooperate with an ordinary magazine, and by the dotted lines the normal position of the parts when that magazine is in operation;

Fig. 12 is a view similar to Fig. 11, showing a corresponding condition of the parts in changing from an ordinary magazine to a display magazine;

Fig. 13 is a detail view showing the means for adjusting the keyboard mechanism;

Fig. 14 is a rear elevation of the parts shown in Fig. 5;

Figure 24:
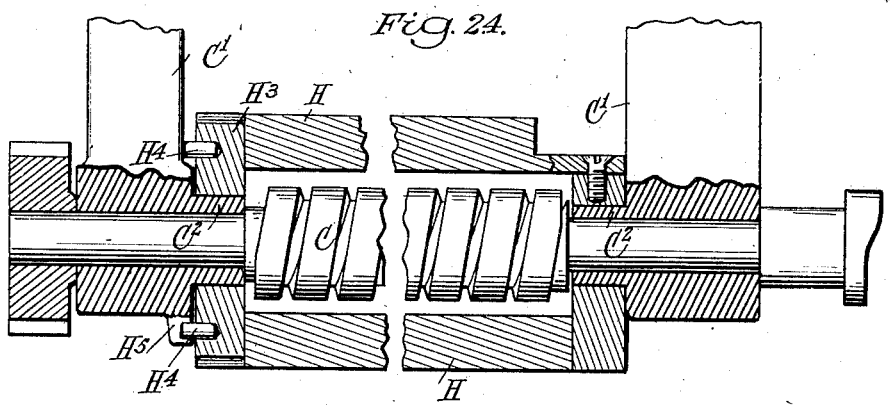
Figure 25:
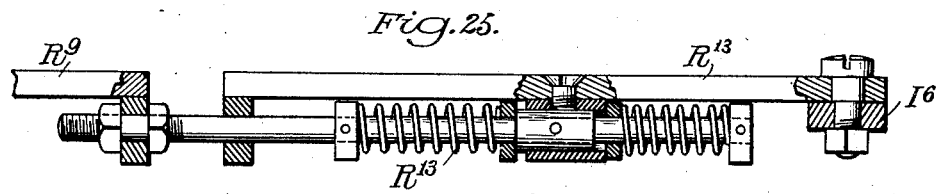
Figure 26:
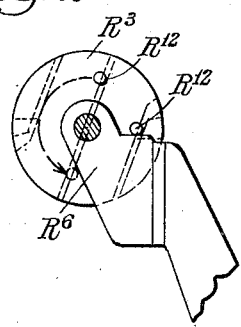
Figure 27:
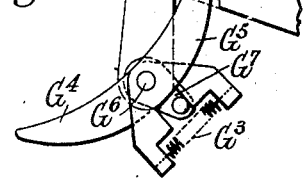
Figure 28:
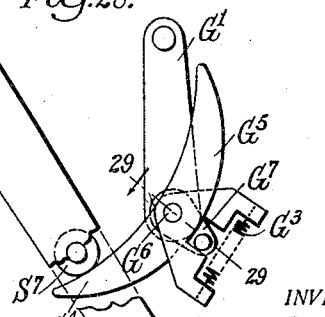

Figs. 15 and 16 are detail sections, taken on lines 15—15 and 16—16, respectively, of Fig. 14;

Figs. 17 and 18 are side elevations of the upper portion of the machine, taken from the side opposite that indicated in the preceding figures, showing the different magazine entrances interchanged in operative position and the cushioning devices associated therewith;

Fig. 19 is an enlarged rear elevation of the distributing mechanism, partly broken away;

Fig. 20 is a detail transverse section, taken on line 20—20 of Fig. 19;

Fig. 21 is a detail perspective view, showing the manner of mounting the distributor bars;

Figs. 22 and 23 are front elevations of the improved assembler entrance, showing respectively the partition plates of one throat section cooperating with matrix columns of a ninety character font, and the partition plates of the other section cooperating with matrix columns of a seventy-two character font;

Fig. 24 is a vertical section, showing the manner of supporting the reversible distributor bars;

Fig. 25 is a detail sectional view of the spring coupling for the throat section operating bar;

Fig. 26 is a detail end view of the throat sections, showing the stop pins therefor;

Figs. 27 and 28 are details of the keyboard adjusting mechanism; and

Figure 29:
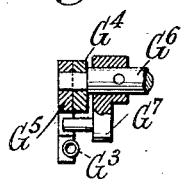

Fig. 29 is a detail section, taken on the line 29—29 of Fig. 28.

Figure 1:
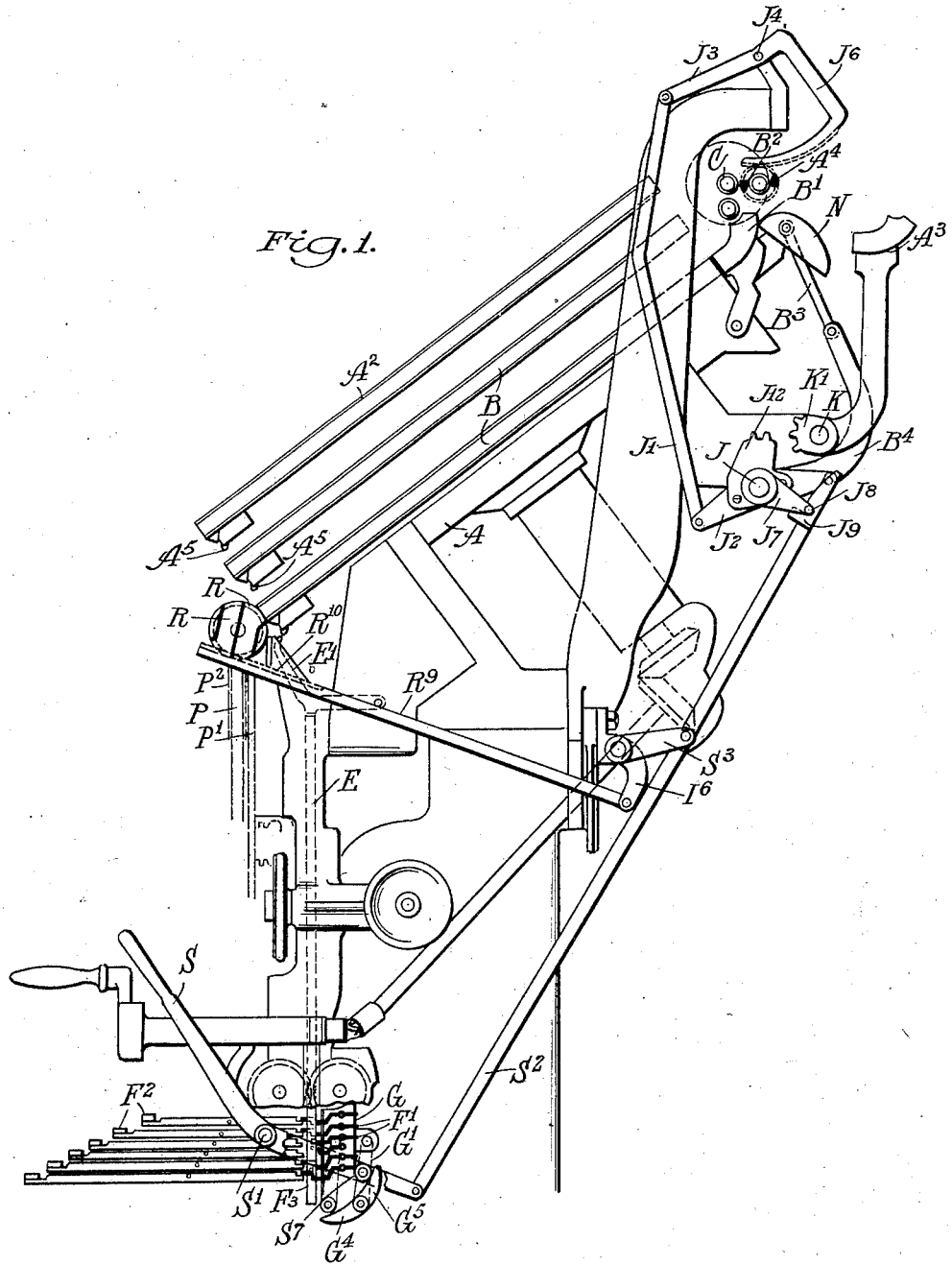
Fig. 1 is a diagrammatic side elevation of a linotype machine, equipped with the present improvements.

The several magazines are carried by a shift frame A composed in part of the two swinging base frames $A^1$ and arranged to be raised and lowered in the well-known manner so as to bring any selected one of the magazines into operative position. As herein indicated, the two lower magazines B are of regular form, each being provided with ninety-one grooved channels spaced apart in the usual way to adapt them to contain an ordinary ninety character matrix font; whereas, the top magazine $A^2$ is of special form, being provided with only seventy-three grooved channels spaced apart in a different manner to adapt them to contain a seventy-two character display font. When one of the magazines B is in operative position, the regular entrance $B^1$ is employed to deliver matrices thereto from the distributing mechanism (see Figs. 1 and 2), and when the magazine $A^2$ occupies such operative position (as in Fig. 5), the special magazine entrance $A^3$ is so employed, said entrances differing in the number and spacing of their channels so as to correspond with the respective magazines. The two entrances are pivoted at different points in the machine frame so that one or the other may be swung into or out of operative position, as required. Two distinct distributor bars $A^4$ and $B^2$ are also provided, and they are arranged so that either may be brought into operative relation to a common set of matrix-conveying screws C and a single distributor box D (Fig. 19). The bar $B^2$ is provided with ninety-one combinations equally spaced apart throughout its length to correspond to the spacing of the partitions $b$ of the magazine entrance $B^1$ and the channels of the respective magazines B (Fig. 4), while the distributor bar $A^4$, although of the same length as the bar $B^2$, is provided with only seventy-three combinations, which are spaced apart at unequal distances throughout its length to correspond to the spacing of the partitions $a$ of the magazine entrance $A^3$ and the channels of the magazine $A^2$ (Fig. 14).

The foregoing parts, their construction and mode of operation, except as hereinafter pointed out, are fully set forth in the Kennedy U. S. Patent No. 1,397,968, and in themselves constitute no part of the present invention. Reference may also be had to the pending application of Ackerman, Ser. No. 54,670, wherein means are provided in connection with the keyboard F for operating the escapements $A^5$ of the magazines through the ordinary vertical reeds E and escapement levers $E^1$, notwithstanding the different location according to character of the matrices therein contained. Such means, as herein indicated (Figs. 1, 8, 13, 27 and 28), include a series of connecting bails or levers $F^1$, which may be adjusted at will to establish one set of connections between the various finger keys $F^2$ and the respective actuating slides $F^3$ when an ordinary ninety character matrix font is in use, or another set of connections between certain selected keys and differently located slides when a seventy-two display matrix font is in use. These bails $F^1$ are pivotally mounted in a box G, which is supported by two pairs of upright parallel links $G^1$ $G^2$, so as to be capable of adjustment back and forth to effect the connections just described. The box G is preferably adjustable through the medium of a spring $G^3$ connecting the short arms of a pair of cooperating cam faced levers $G^4$ $G^5$, which are loosely mounted on an extended fulcrum pin $G^6$ of the link $G^1$ and arranged to alternately engage a short crank arm $G^7$ fastened to said pin. Rocking of the links $G^1$ $G^2$ is thus accomplished as the levers $G^4$ and $G^5$ are operated and the desired movement transmitted to the box G. As these parts and their mode of operation are fully set forth in the Ackerman Patent No. 1,626,773, dated May 3, 1927, no further description need be given herein.

According to the present invention, the distributor bars are arranged in offset, parallel, inverted relation to each other upon a reversible yoke or support H rotatably mounted at its ends upon bearing nipples $C^2$ concentric with one of the conveying screws C and protruding inwardly from the screw supporting arms C¹ (see particularly Fig. 24). This arrangement in itself is very advantageous, since the bars may thus be confined within a limited space and their interchange effected with the greatest accuracy and facility, a half rotation of the support H in either direction being sufficient to bring one or the other of said bars into operative or distributing position. In order to arrest the bars in such position, the support H is provided with a pair of stop pins H⁴ protruding axially from a spur gear H³ fastened to one end of said support and arranged alternately to engage a lug H⁵ depending from one of the screw supporting arms C¹ (Fig. 19).

The matrices are delivered to the selected distributor bar in the usual way from a distributor box D (Fig. 19) provided with upper and lower pairs of matrix sustaining rails D² D³ having extensions D⁴ D⁵, respectively, the latter affording shoulders D⁶ against which the matrices are arrested as they are pushed through the box. The box is further equipped with a matrix lifting finger D¹ arranged to engage the bottom edges of the matrices and lift them successively above the arresting shoulders into the threads of the conveying screws C. Ordinarily, the two upper rails D² are identical, both being formed with integral extensions. In the present instance, however, and to permit the free rotation of the bar support H, the extension of one of the rails D² (the one at the left in Fig. 20) is constituted by one or the other of two plates H¹ H² carried by the support H at points adjacent the box D and adapted to align with said rail when either bar is brought into operative relation to the distributor box and conveying screws. Thus, when the bar A⁴ is in operative position (Fig. 19), the plate H¹ registers longitudinally with the affected rail D² and acts as an extension therefor, whereas, when the bar B² is in operative position, the other plate H² is brought into registration with said rail to act as an extension. In this way, the leading matrix of a line is properly arrested in the lifting position and guided onto the distributor bar in the same manner as heretofore.

In selecting one or the other of the two distributor bars for use, it is preferred to carry out a half-rotation of the support H in opposite directions, or in other words, to reverse the position thereof. In this connection, it may be noted that clearance between the support and the end portion of the rail D² just referred to is afforded by recessing the former as at H⁶ (Fig. 21). In the present instance (Figs. 2, 5, 11, 12, 14, 17, 18, 19), the reversal of the support H and the consequent interchange of the bars is accomplished from a rock shaft I mounted in the machine frame through the medium of links I¹ J¹ and an intermediate connecting lever J² loosely mounted on a rock shaft J. The link I¹ is pivoted at its lower end to the shorter arm of a bell crank lever I² keyed to the shaft I, and the link J¹ is pivoted at its upper end to one arm of a lever J³ loosely mounted on a fixed horizontal shaft J⁴, the other arm of said lever J³ being detachably connected as at J⁵ (Fig. 14) to a gear segment J⁶ also journalled on the said shaft J⁴ and normally meshing with the spur gear H³, which, it will be remembered, is fixed to the rotatable bar support H. The lower end of the link J¹ is coupled to the lever J² so as to be operated thereby in both directions through the medium of compression springs j. With this arrangement, rotation of the shaft I in one direction causes the link I¹ to rock the lever J² so as to draw the link J¹ downwardly and, through the lever J³ and segment J⁶, rotate the support H, whereby the distributor bars are turned about their axis of rotation in a clock-wise direction (according to Fig. 20) until the regular or ninety-one combination distributor bar B² is arrested by the stop lug H⁵ in operative position. Conversely, a rotation of the shaft I in the opposite direction reverses the support H through the connections just described and brings the special seventy-three combination distributor bar A⁴ into action.

The operation of the shaft I is herein effected by means of a hand lever S arranged at the front of the machine within easy reach of the operator. This hand lever (see Fig. 8) is pivoted at S¹ to the keyboard frame and is connected to the rock shaft I through a link S² and a crank arm S³, said lever being provided with a suitable latch S⁴ adapted to engage in notches S⁵ of a sector plate S⁶ to hold the lever and the connected parts in one position or another.

The means employed for interchanging the entrances will now be described, it being understood that since the two entrances are adapted to occupy the same operative position, the one in use must be moved out of the way before it can be replaced by the other. The entrance B¹ is pivotally mounted on fixed brackets O forming part of the machine frame and is controlled in its movements to and from operative position from the rock shaft J by an adjustable link B³ and a curved lever arm B⁴. As best shown in Fig. 14, a torsion spring B⁵ fastened at one end to the shaft J and at the other end to the arm B⁴, which is loose on said shaft, constitutes the medium through which the entrance is lifted to its operative position and by which it is permitted to be swung rearwardly for access to the magazines when required. A short arm B⁶, fast to the shaft J and arranged to engage a pin B⁷ projecting laterally from the side of the arm B⁴, moves the entrance $B^1$ from its active to its inactive position. The shaft J, journalled in fixed brackets $O^1$ $O^2$ on opposite sides of the machine, is also provided with a crank arm $J^7$ having a pin $J^8$ arranged to be engaged by a finger $J^{10}$ rising from a notched plate $J^9$ secured to the link $I^1$, the arrangement being such that as the link $I^1$ is moved upwardly or rearwardly from the position shown in Fig. 5 the shaft J will be rotated in an anti-clockwise direction until sufficient power is stored up by the spring $B^5$ to swing the entrance $B^1$ upwardly and hold it under tension in its active position as shown in Fig. 2. In this position of the entrance, it will be noted that the pin $J^8$ has been caused to enter the notch $J^{11}$ of the plate $J^9$, so that when the link $I^1$ is later drawn downwardly or forwardly, the shaft J will be rotated in the reverse direction and the arm $B^6$ brought to bear against the pin $B^7$ to swing the entrance back to its original inactive position.

The entrance $A^3$ is pivotally mounted on a rock shaft K, also journalled in the brackets $O^1$ $O^2$, and is controlled by a gear segment $J^{12}$ fastened to the lever $J^2$ and arranged to mesh with a similar gear segment $K^1$ keyed to the shaft K. A torsion spring $K^2$, surrounding the shaft K and acting in a fashion similar to the spring $B^5$, serves as the medium through which the entrance $A^3$ is swung into active position, the free end of said spring being hooked into a small bracket $A^6$ forming part of the entrance frame (see Fig. 14). The shaft K has a short arm $K^3$ (corresponding to the arm $B^6$ of the shaft J) adapted through its engagement with a pin $A^7$ protruding from the lower part of the entrance frame (look at the left in Fig. 14) to swing the entrance $A^3$ to its inactive position. Thus, by rocking the lever $J^2$ clockwise, the shaft K is rotated in the opposite direction through the intermeshing of the segments $J^{12}$ and $K^1$, and through the spring $K^2$ swings the entrance $A^3$ from its inactive position to its active position (Fig. 5). A reversal of the operation brings the short arm $K^3$ into engagement with the pin $A^7$ and thereby restores the entrance to its inactive position. (Fig. 2.)

According to the present arrangement, and for reasons which will later appear, both entrances are disconnected from their respective operating means when they are swung backwardly to their inoperative positions; that is to say, the segments $J^{12}$ $K^1$, which control the operation of the entrance $A^3$, break their engagement at such times (see Fig. 2), and the plate $J^9$, which operates the entrance $B^1$, breaks its connection with the crank arm $J^7$ (see Fig. 5). Means are therefore provided to arrest and support the respective entrances in their inactive positions, and in the embodiment illustrated (Figs. 17 and 18) said means comprise a pair of three-armed levers L and M pivoted to the bracket $O^2$ and controlled by springs $L^1$ and $M^1$ respectively, these springs possessing sufficient strength to sustain the weight of the entrances and to serve as a counter-balance therefor. The lever L, which is adapted to cooperate with the entrance $A^3$, is normally held by the spring $L^1$ against a fixed stop $O^3$ and is provided with a pin $L^2$ arranged in the path of the entrance as the latter is swung rearwardly, so that when the segments $J^{12}$ $K^1$ become disengaged the entrance will be supported by said pin under the tension of the spring $L^1$ (Fig. 17). The lever M, on the other hand, is normally held by the spring $M^1$ against a stop pin $O^4$ and, although functioning in a manner similar to the lever L, is connected to the curved arm of the entrance $B^1$ through a sleeve $M^2$ on the rock shaft J (see Fig. 14), the said sleeve being provided at the end adjacent the arm $B^4$ with a lug $M^3$ arranged to be engaged by the pin $B^7$ projecting from said arm and being provided at its other end with a finger $M^4$ having a set screw $M^5$ arranged to engage an arm $M^6$ of the lever M. Consequently, when the plate $J^9$ breaks its engagement with the crank arm $J^7$, the entrance $B^1$ will be sustained by the spring $M^1$ through the sleeve $M^2$ and the connections just described. (Fig. 18.)

The operation in effecting the interchange of the entrances will now be clear. Assuming the parts to be in the position shown in Fig. 2 and a change of entrance desired, the link $I^1$ is drawn downwardly by the rotation of the shaft I from the hand lever S and, since the pin on the crank arm $J^7$ is seated at this time in the notch $J^{11}$ of the plate $J^9$, the short arm $B^6$ (which, as before stated, is fixed to the shaft J) immediately engages the pin $B^7$ on the curved arm $B^4$ and swings the entrance $B^1$ backwardly to its inactive position before the gear segment $J^{12}$ is brought into engagement with the gear segment $K^1$. The continued rotation of the shaft I then brings the segments into mesh and turns the shaft K, causing it through the spring $K^2$ to rock the entrance $A^3$ upwardly into operative position, the pin $J^8$ of the crank arm $J^7$ meanwhile passing out of the notch in the plate $J^9$, which moves on with the link $I^1$ to the position shown in Fig. 5. When the operation is reversed, the shaft K is rotated in the oppoiste direction at once by the gear segments $J^{12}$, $K^1$, causing the short arm $K^3$ by its engagement with the pin $A^7$ to swing the entrance $A^3$ backwardly all the way to inactive position. At that time, the finger $J^{10}$ of the plate $J^9$ engages the pin on the crank arm $J^7$ and the continued movement of the link $I^1$ turns the shaft J and through the spring $B^5$ rocks the entrance B¹ upwards into operative position, the gear segments J¹² K¹ meanwhile passing out of mesh (see Fig. 2). It will be remembered that the springs L¹ and M¹ support the two entrances when they are in their inactive position and temporarily disconnected from the operating means. A slotted link A⁸ arranged between the entrance A³ and the main frame is provided merely as a means of safety to guard against any damage that might result from throwing the entrance too far rearwardly or from the accidental breaking of the sustaining spring L¹. A curved plate N fastened to the entrance B¹ is also provided to prevent damage to the partitions a of the entrance A³ if the latter should be accidentally pushed from its inactive position against the entrance B¹.

It will now be seen that the operation of the hand lever S not only effects the interchange of the distributor bars, but, in addition, the simultaneous and corresponding interchange of the magazine entrances, the arrangement being such that the entrance A³ and bar A⁴ are conjointly selected to distribute matrices of the display fonts into the seventy-two channeled magazine A² when the shaft I is rotated in one direction, and the entrance B¹ and bar B² conjointly selected to distribute matrices of an ordinary font into a ninety-one channeled magazine B when said shaft is rotated in the opposite direction.

Attention is now directed to Figs. 8, 9, 10, 22 and 23, which illustrate the improvements made in the assembler entrance. The latter presents a main section P made up, as usual, of a back plate P¹, a cover plate P², and a series of intervening upright matrix guides or partition plates P³, such parts being shorter than heretofore or cut away at the top to accommodate a pair of throat sections R R¹. In the preferred embodiment illustrated, these throat sections are rotatably mounted for interchange, being attached to two circular end plates R², R³ provided with trunnions R⁴ R⁵ journalled in fixed supporting brackets R⁶. Stop pins R¹² carried by the end plate R³ (see Fig. 26) and arranged to cooperate with the supporting bracket R⁶ serve to arrest the throat sections in their respective operative positions. The trunnions R⁴, R⁵, which form the pivotal axis about which the throat sections turn, are arranged in the line of intersection between the central vertical plane of the main section P and the central longitudinal plane of the magazine in use, thereby insuring the free rotation of the throat sections and keeping them within a limited space. It will be noted (Fig. 9) that the throat sections are inverted with relation to each other so that by turning the end plates through 180 degrees in reverse directions, one throat section or the other may be brought into operative relation to the magazine in use and the main section of the assembler entrance, as desired. Each throat section is provided with its own series of partition plates r, which are anchored in slots formed in oppositely disposed base plates R⁷, R⁷ attached to the end plates R², R³ (Fig. 10). The greatest degree of accuracy is thus assured in the alignment of the partition plates of both sections with the matrix columns of the respective fonts, since the relative positions of the partition plates, once determined, are always maintained. A division plate R⁸ arranged between the two series of partition plates and also connected to the end plates R² R³ normally registers with the cover plates P² and serves to deflect and direct the matrices in their passage through either throat section into the main section P. Fig. 22 shows the throat section R in operative relation to a regular or ninety-one channel magazine, while Fig. 23 shows the throat section R¹ in operative relation to a special or seventy-three channeled magazine. As will be noted, the lower ends of the partition plates r of both throat sections register with the upper ends of the plates P³ of the main section P, although the spacing of the upper ends of the partition plates r differs in the respective throat sections, those of one section being spaced apart to cooperate with the matrix columns of the ordinary fonts, and those of the other section being differently spaced apart to cooperate with the matrix columns of the display fonts. In other words, when the throat section R is in use, its partition plates r will be disposed at certain angles from the points of registration with the main partition plates P³ to handle matrices of the ordinary fonts; whereas, when the throat section R¹ is in use, its partition plates will be disposed at different angles from such points of registration to serve in like manner to handle matrices of the display fonts.

While it is obvious that the throat sections R R¹ might be rotated independently in effecting their interchange, it is proposed, according to the present invention, to couple them to the magazine entrances and distributor bars in such manner that the corresponding interchange of all three parts may be carried out simultaneously or at one operation. To this end (Fig. 8), the throat sections are provided with a gear segment R¹¹ fast to the trunnion R⁵ and arranged to mesh with a rack R¹⁰, which latter is connected by a link R⁹ to an arm I⁶ depending from the shaft I. It is preferred that the turning of the throat sections be effected through the medium of springs rather than by positive connections, and hence the link R⁹ is provided with a two-way yielding section R¹³ such as that shown in detail in Fig. 25. As a result of this arrangement, the rotation of the shaft I by the hand lever S not only effects the interchange of the distributor bars and magazine entrances in the manner before stated, but also turns the assembler throat sections in one direction or the other through the required 180° to effect their interchange.

In carrying out the invention, it is also proposed, in interchanging the distributor bars, magazine entrances and assembler throat sections, to effect the simultaneous and corresponding adjustment of the keyboard mechanism. This is accomplished by providing the hand lever S (Figs. 1, 8, 27 and 28) with a roller $S^7$ arranged in constant engagement with the cam faced levers $G^4$ $G^5$ before mentioned, and acting, when the hand lever is operated to rotate the shaft I, to adjust the bail box G in the manner previously described. It may be noted at this point that the yielding connections provided throughout the train of mechanism operated in common by the hand lever S avoid damage to the parts in the event of undue resistance offered to their movements and, moreover, permit of a slight overthrow which compensates for any lost motion in the train. As will be remembered, each of the adjustable organs affected is limited in its adjustments by fixed stops or abutments, so that the overthrow of the operating connections in no way interferes with the proper location of said organs, but actually assists in bringing this about.

It will have been understood from the foregoing description, that in the use of a display font, the magazine entrance $A^3$, distributor bar $A^4$, and the assembler throat section $R^1$ are all brought into operative position to cooperate with the magazine $A^2$ and the keyboard F connected to the appropriate channels, whereas, in the use of an ordinary font, the magazine entrance $B^1$, distributor bar $B^2$, and the assembler throat section R are all brought into such operative position to cooperate with one of the magazines B and the keyboard F connected to the appropriate channels, these various parts and their operating connections being specially arranged and coordinated in such manner that, by a single operation of the hand lever S, the machine may be instantly adapted to one font or the other, as desired.

As another feature of the invention, means are provided to prevent the interchange of the distributor bars, magazine entrances, and assembler throat sections, as well as the adjustment of the keyboard mechanism without also interchanging the magazines to correspond, so as to thus guard against any inadvertence or lack of attention on the part of the operator, who might otherwise shift an ordinary magazine into operative position when the other parts were set to cooperate with a display magazine, or vice versa, or who might otherwise operate the hand lever S to reset the connected parts without changing the magazines. In the embodiment illustrated (see particularly Figs. 2, 3, 5, 7, 11 and 12), the shift frame A carries a depending member T slidably mounted in fixed guides $T^1$ $T^2$ and arranged to co-operate with a cross member $I^3$ of the bell crank lever $I^2$ before referred to. As shown in Fig. 5, the bar T is provided at its lower end with a tongue $T^3$ and about midway of its length with a plate $T^4$, the latter having a notch $T^5$, adapted to receive a lip $I^4$ formed on the cross member $I^3$. The parts are so arranged that when the display magazine is in use (Fig. 5), the lip $I^4$ will engage in the notch $T^5$ and lock the shaft I against rotation, and when either of the ordinary magazines is in use (Fig. 2) the tongue $T^3$ will stand in front of the cross member $I^3$ and likewise lock the shaft I against rotation. When the display magazine $A^2$ is in use (Fig. 5), the lip $I^4$ will engage in the notch $T^5$ and lock the shaft I against rotation, thereby preventing the interchange of the distributor bars, magazine entrances, etc.; and in the same condition of the parts, the lip $I^4$ will stand in the path of the tongue $T^3$ and prevent the shift frame A from being raised far enough to bring either of the underlying ordinary magazines B into use. On the other hand, when the ordinary magazine B is in use (see Fig. 2 which shows the lowermost magazine in operative position), the tongue $T^3$ will stand in front of the cross member $I^3$ and likewise lock the shaft I against rotation, thereby preventing the interchange of the distributor bars, magazine entrances, etc.; and in this condition of the parts, the cross member $I^3$ will be located in position to engage the plate $T^4$ and prevent the shift frame A from being lowered far enough to bring the display magazine $A^2$ into use.

In changing from the display magazine $A^2$ to an ordinary magazine B, the shift frame A is elevated slightly to locate the magazines in the abnormal position shown by the full lines in Fig. 11. This operation carries the plate $T^4$ upwardly clear of the cross member $I^3$, which therefore permits the shaft I to be rotated by the hand lever S in operating the connected parts, in the manner indicated by the dotted lines, to effect the proper interchange of the distributor bars, magazine entrances, etc. The magazines are then elevated the remaining distance, as indicated by the dotted lines, to bring the selected magazine B into operative relation to the newly selected parts. In changing from an ordinary magazine B to the display magazine $A^2$, the shift frame A is lowered slightly to locate the magazines in the abnormal position shown by the full lines in Fig. 12. This operation carries the tongue T³ downwardly clear of the cross member I³, which therefore permits the shaft I to be rotated by the hand lever S in operating the connected parts, in the manner indicated by the dotted lines, to effect the proper interchange of the distributor bars, magazine entrances, etc. The magazines are then lowered the remaining distance, as indicated by the dotted lines, to bring the selected magazine A² into operative relation to the newly selected parts. It will be seen, therefore, that the magazines are so coupled up with the other parts as to insure their mutual cooperation under all conditions of use.

As a guide to the operator in effecting an interchange of parts, there is attached to the fixed machine frame (see Fig. 3) a pointer V adapted to register with a stud V¹ on the front edge of the bar T when the magazines are shifted to the abnormal position above described.

As before stated, the present improvements have been shown merely in preferred form and by way of example and as applied to the particular kind of machine, but obviously many modifications and alterations therein and in their mode of adaptation will readily suggest themselves to those skilled in the art and still be comprised within the scope of the invention.

This application is a continuation in part of an application filed by me on October 25th, 1924, Serial No. 745,798.

Having thus described my invention, its construction and mode of operation, what I claim and desire to secure by Letters Patent of the United States, is as follows:

1. In a typographical composing and distributing machine adapted to be equipped with interchangeable magazines, one containing a set of matrices occupying certain channels according to character, and the other containing a set of matrices occupying differently located channels according to character, the combination of two distributor bars differing as to form to correspond to the respective magazines and movably mounted so as to be interchangeable in operative position with each other, and an assembler entrance arranged to receive matrices as they are discharged from the magazine in use, the said entrance being provided with two distinct throat sections provided with differently located fixed partition plates to correspond to the respective magazines and movably mounted so as to be interchangeable in operative position with each other.

2. In a typographical composing and distributing machine adapted to be equipped with interchangeable magazines, one containing a set of matrices occupying certain channels according to character, and the other containing a set of matrices occupying differently located channels according to character, the combination of two distributor bars differing as to form to correspond to the respective magazines and movably mounted so as to be interchangeable in operative position with each other, an assembler entrance provided with two throat sections also differing as to form to correspond to the respective magazines and movably mounted so as to be interchangeable in operative position with each other, and means to insure a corresponding interchange of the distributor bars and throat sections.

3. In a typographical composing and distributing machine adapted to be equipped with interchangeable magazines, one containing a set of matrices occupying certain channels according to character, and the other containing a set of matrices occupying differently located channels according to character, the combination of two distributor bars differing as to form to correspond to the respective magazines and movably mounted so as to be interchangeable in operative position with each other, an assembler entrance provided with two throat sections also differing as to form to correspond to the respective magazines and movably mounted so as to be interchangeable in operative position with each other, and unitary means for effecting simultaneously the required interchange of the distributor bars and throat sections.

4. In a typographical composing and distributing machine adapted to be equipped with interchangeable magazines, one containing a set of matrices occupying certain channels according to character, and the other containing a set of matrices occupying differently located channels according to character, the combination of two magazine entrances differing as to form to correspond to the respective magazines and movably mounted so as to be interchangeable in operative position with each other, and an assembler entrance arranged to receive matrices as they are discharged from the magazine in use, the said entrance being provided with two throat sections also differing as to form to correspond to the respective magazines and movably mounted so as to be interchangeable in operative position with each other.

5. In a typographical composing and distributing machine adapted to be equipped with interchangeable magazines, one containing a set of matrices occupying certain channels according to character, and the other containing a set of matrices occupying differently located channels according to character, the combination of two magazine entrances differing as to form to correspond to the respective magazines and movably mounted so as to be interchangeable in operative position with each other, an assembler entrance provided with two throat sections also differing as to form to correspond to the respective magazines and movably mounted so as to be interchangeable in operative position with each other, and means to insure a corresponding interchange of the magazine entrances and throat sections.

6. In a typographical composing and distributing machine adapted to be equipped with interchangeable magazines, one containing a set of matrices occupying certain channels according to character, and the other containing a set of matrices occupying differently located channels according to character, the combination of two magazine entrances differing as to form to correspond to the respective magazines and movably mounted so as to be interchangeable in operative position with each other, an assembler entrance provided with two throat sections also differing as to form to correspond to the respective magazines and movably mounted so as to be interchangeable in operative position with each other, and unitary means for effecting simultaneously the required interchange of the magazine entrances and throat sections.

7. In a typographical composing and distributing machine adapted to be equipped with interchangeable magazines, one containing a set of matrices occupying certain channels according to character, and the other containing a set of matrices occupying differently located channels according to character, the combination of two magazine entrances differing as to form to correspond to the respective magazines and movably mounted so as to be interchangeable in operative position with each other, an assembler entrance provided with two throat sections also differing as to form to correspond to the respective magazines and movably mounted so as to be interchangeable in operative position with each other, and two distributor bars likewise differing as to form to correspond to the respective magazine entrances and movably mounted for interchange.

8. In a typographical composing and distributing machine adapted to be equipped with interchangeable magazines, one containing a set of matrices occupying certain channels according to character, and the other containing a set of matrices occupying differently located channels according to character, the combination of two magazine entrances differing as to form to correspond to the respective magazines and movably mounted so as to be interchangeable in operative position with each other, an assembler entrance provided with two throat sections also differing as to form to correspond to the respective magazines and movably mounted so as to be interchangeable in operative position with each other, two distributor bars likewise differing as to form to correspond to the respective magazine entrances and movably mounted for interchange, and means to insure a corresponding interchange of the magazine entrances, throat sections and distributor bars.

9. In a typographical composing and distributing machine adapted to be equipped with interchangeable magazines, one containing a set of matrices occupying certain channels according to character, and the other containing a set of matrices occupying differently located channels according to character, the combination of two magazine entrances differing as to form to correspond to the respective magazines and movably mounted so as to be interchangeable in operative position with each other, an assembler entrance provided with two throat sections also differing as to form to correspond to the respective magazines and movably mounted so as to be interchangeable in operative position with each other, two distributor bars likewise differing as to form to correspond to the respective magazine entrances and movably mounted for interchange, and unitary means for effecting simultaneously the required interchange of the magazine entrances, throat sections and distributor bars.

10. In a typographical composing and distributing machine adapted to be equipped with interchangeable magazines, one containing a set of matrices occupying certain channels according to character, and the other containing a set of matrices occupying differently located channels according to character, the combination of two distributor bars differing as to form to correspond to the respective magazines and rotatably mounted for interchange, an assembler entrance provided with two throat sections also differing as to form to correspond to the respective magazines and rotatably mounted for interchange, and connections between the distributor bars and throat sections to insure their corresponding interchange.

11. In a typographical composing and distributing machine adapted to be equipped with interchangeable magazines, one containing a set of matrices occupying certain channels according to character, and the other containing a set of matrices occupying differently located channels according to character, the combination of a distributing mechanism adjustable to cooperate with the matrices of the magazine in use, assembling mechanism likewise adjustable to cooperate with the matrices of the magazine in use, and means to insure the corresponding adjustment of said distributing and assembling mechanisms.

12. In a typographical composing and distributing machine adapted to be equipped with interchangeable magazines, one containing a set of matrices occupying certain channels according to character, and the other containing a set of matrices occupying differently located channels according to character, the combination of a distributing mechanism adjustable to cooperate with the matrices of the magazine in use, assembling mechanism likewise adjustable to cooperate with the matrices of the magazine in use, and unitary means for effecting simultaneously the required adjustment of the distributing and assembling mechanisms.

13. In a typographical distributing machine, the combination of two magazine entrances differing as to form and movably arranged so as to be interchangeable in operative position with each other, two distributor bars also differing as to form to correspond to the respective magazine entrances and movably mounted so as to be interchangeable in operative position with each other, and means to insure a corresponding interchange of the magazine entrances and the distributor bars.

14. In a typographical distributing machine, the combination of two magazine entrances differing as to form and movably arranged so as to be interchangeable in operative position with each other, two distributor bars also differing as to form to correspond to the respective magazine entrances and movably mounted so as to be interchangeable in operative position with each other, and unitary means for effecting simultaneously the required interchange of the magazine entrances and distributor bars.

15. Typographical distributing mechanism including, in combination, a set of matrix conveying devices, and two distributor bars arranged in offset parallel relation to each other and mounted to turn about a common longitudinal axis so that either may be brought into operative relation to the said conveying devices.

16. Typographical distributing mechanism including, in combination, a set of matrix conveying devices, and two distributor bars arranged in offset, parallel, inverted relation to each other and reversible at will so that either may be brought into operative relation to said conveying devices.

17. Typographical distributing mechanism including, in combination, a set of matrix conveying screws, and two distributor bars mounted to turn about an axis coincident with the axis of one of said screws so that either bar may be brought into the distributing position.

18. Typographical distributing mechanism including, in combination, a set of matrix conveying screws, and a distributor bar rotatably mounted on one of said screws so that it may be turned into or out of the distributing position.

19. Typographical distributing mechanism including, in combination, a set of matrix conveying screws, two distributor bars, and a rotatable support carrying said bars and journalled on one of said screws.

20. In a typographical distributing machine, the combination of a set of matrix conveying screws, two distributor bars arranged in parallel inverted relation to each other, a reversible support mounted to turn about the axis of one of said screws and to which the bars are attached, and means for turning the support to bring either bar into operative relation to the conveying screws, as desired.

21. In a typographical distributing machine, the combination of a set of matrix conveying devices, a distributor bar movable into and out of operative relation to said devices, and a distributor box provided with a pair of matrix sustaining rails, one of said rails having an extension carried by the movable distributor bar.

22. In a typographical distributing machine, the combination of a set of matrix conveying devices, two distributor bars movably arranged so that either may be brought into operative relation to said devices, and a distributor box provided with a pair of matrix sustaining rails, one of said rails having an extension carried by each distributor bar, for the purpose described.

23. In a typographical composing machine adapted to be equipped with interchangeable magazines, one containing a set of matrices occupying certain channels according to character, and the other containing a set of matrices occupying differently located channels according to character, an assembler entrance provided with two distinct throat sections equipped with differently located fixed partition plates and movably arranged so that one or the other may be brought into operative position for cooperation with the matrices of the magazine in use.

24. In a typographical composing machine adapted to be equipped with interchangeable magazines, one containing a set of matrices occupying certain channels according to character, and the other containing a set of matrices occupying differently located channels according to character, the combination of an assembler entrance provided with two distinct throat sections equipped with differently located fixed partition plates and movably mounted in the machine, and means operable at will to bring one throat section or the other into position for cooperation with the matrices of the magazine in use.

25. In or for a typographical composing machine, an assembler entrance provided with two distinct throat sections equipped with differently located fixed partition plates and arranged in inverted relation to each other and reversible at will for interchange.

26. In or for a typographical composing machine, an assembler entrance provided with two throat sections interchangeable in position with each other and rotatably mounted for interchange.

27. In a typographical composing machine adapted to be equipped with interchangeable magazines, one containing a set of matrices occupying certain channels according to character, and the other containing a set of matrices occupying differently located channels according to character, the combination of an assembler entrance provided with two distinct throat sections movably arranged and each formed with a series of fixed partition plates, those of one section being spaced apart to cooperate with the matrices of one magazine, and those of the other section being spaced apart to cooperate with the matrices of the other magazine, and means for bringing either throat section into operative position, as desired.

28. In a typographical composing machine, the combination of an assembler entrance comprising a main section provided with a series of partition plates, and two interchangeable throat sections each likewise provided with a series of partition plates, those of one throat section being disposed at certain angles, and those of the other throat section being disposed at different angles.

29. In a typographical composing machine, the combination of an assembler entrance comprising a main section provided with a series of partition plates, and two interchangeable throat sections each likewise formed with a series of partition plates, those of one throat section differing as to the angle at which they are disposed from those of the other throat section, but those of both throat sections being arranged to register with the upper ends of the partition plates of the main section when in use.

30. In a typographical composing machine adapted to be equipped with interchangeable magazines, one containing a set of matrices occupying certain channels according to character, and the other containing a set of matrices occupying differently located channels according to character, the combination of an assembler entrance comprising a main section provided with a series of partition plates and two interchangeable throat sections each likewise formed with a series of partition plates adapted to register with those of the main sections, the said plates of one throat section being disposed at certain angles from the point of registration with the plates of the main section to cooperate with the matrices of one magazine, and those of the other throat section being disposed at different angles from the point of registration to cooperate with the matrices of the other magazine, and means for bringing either throat sections into use, as desired.

31. In or for a typographical composing machine, an assembler entrance comprising a main section and two inverted throat sections rotatably mounted for interchange, said throat sections being made up of two outer base plates, an intermediate division plate, and two series of partition plates arranged between the division plate and the respective base plates, substantially as shown and described.

32. In a typographical composing and distributing machine adapted to be equipped with interchangeable magazines, one containing a set of matrices occupying certain channels according to character, and the other containing a set of matrices occupying differently located channels according to character, an assembler entrance comprising a vertically disposed main section and two inverted throat sections rotatably mounted so that either may be brought into operative relation to the main section and the magazine in use, the axis of rotation of said throat sections being located substantially at the line of intersection of the plane of the magazine with the plane of the main section.

33. In a typographical composing and distributing machine adapted to be equipped with interchangeable magazines, one containing a set of matrices occupying certain channels according to character, and the other containing a set of matrices occupying differently located channels according to character, the combination of two distributor bars differing as to form to correspond to the respective magazines and movably mounted so as to be interchangeable in operative position with each other, an adjustable keyboard mechanism serving under different conditions of adjustment to effect the release of corresponding matrices from the respective magazines, and means to ensure the corresponding interchange and adjustment of the distributor bars and keyboard mechanism, respectively.

34. In a typographical composing and distributing machine adapted to be equipped with interchangeable magazines, one containing a set of matrices occupying certain channels according to character, and the other containing a set of matrices occupying differently located channels according to character, the combination of two distributor bars differing as to form to correspond to the respective magazines and movably mounted so as to be interchangeable in operative position with each other, an adjustable keyboard mechanism serving under different conditions of adjustment to effect the release of corresponding matrices from the respective magazines, and unitary means for effecting simultaneously the required interchange and adjustment of the distributor bars and keyboard mechanism, respectively.

35. In a typographical composing and distributing machine adapted to be equipped with interchangeable magazines, one containing a set of matrices occupying certain channels according to character, and the other containing a set of matrices occupying differently located channels according to character, the combination of two magazine entrances differing as to form to correspond to the respective magazines and movably mounted so as to be interchangeable in operative position with each other, an adjustable keyboard mechanism serving under different conditions of adjustment to effect the release of corresponding matrices from the respective magazines, and means to ensure the corresponding interchange and adjustment of the magazine entrances and keyboard mechanism, respectively.

36. In a typographical composing and distributing machine adapted to be equipped with interchangeable magazines, one containing a set of matrices occupying certain channels according to character and the other containing a set of matrices occupying differently located channels according to character, the combination of two magazine entrances differing as to form to correspond to the respective magazines and movably mounted so as to be interchangeable in operative position with each other, an adjustable keyboard mechanism serving under different conditions of adjustment to effect the release of corresponding matrices from the respective magazines, and unitary means for effecting simultaneously the required interchange and adjustment of the magazine entrances and keyboard mechanism, respectively.

37. In a typographical composing machine adapted to be equipped with interchangeable magazines, one containing a set of matrices occupying certain channels according to character, and the other containing a set of matrices occupying differently located channels according to character, the combination of an assembler entrance provided with two distinct throat sections equipped with differently located fixed partition plates to correspond to the respective magazines and movably mounted so as to be interchangeable in position with each other, and an adjustable keyboard mechanism serving under different conditions of adjustment to effect the release of corresponding matrices from the respective magazines.

38. In a typographical composing machine adapted to be equipped with interchangeable magazines, one containing a set of matrices occupying certain channels according to character, and the other containing a set of matrices occupying differently located channels according to character, the combination of an assembler entrance provided with two throat sections differing in form to correspond to the respective magazines and movably mounted so as to be interchangeable with each other, an adjustable keyboard mechanism serving under different conditions of adjustment to effect the release of corresponding matrices from the respective magazines, and means to ensure the corresponding interchange and adjustment of the throat sections and keyboard mechanism, respectively.

39. In a typographical composing machine adapted to be equipped with interchangeable magazines, one containing a set of matrices occupying certain channels according to character, and the other containing a set of matrices occupying differently located channels according to character, the combination of an assembler entrance provided with two throat sections differing in form to correspond to the respective magazines and movably mounted so as to be interchangeable in position with each other, an adjustable keyboard mechanism serving under different conditions of adjustment to effect the release of corresponding matrices from the respective magazines, and unitary means for effecting simultaneously the required interchange and adjustment of the throat sections and keyboard mechanism, respectively.

40. In a typographical composing and distributing machine adapted to be equipped with interchangeable matrix magazines, the combination of two distributor bars differing as to form to correspond to the respective magazines and movably mounted so as to be interchangeable in operative position with each other, two magazine entrances also differing as to form to correspond to the respective magazines and movably mounted so as to be interchangeable in operative position with each other, an adjustable keyboard mechanism serving under different conditions of adjustment to effect the release of corresponding matrices from the respective magazines, and means to ensure the corresponding interchange of the distributor bars and magazine entrances as well as the corresponding adjustment of the keyboard mechanism.

41. In a typographical composing and distributing machine adapted to be equipped with interchangeable matrix magazines, the combination of two distributor bars differing as to form to correspond to the respective magazines and movably mounted so as to be interchangeable in operative position with each other, two magazine entrances also differing as to form to correspond to the respective magazines and movably mounted so as to be interchangeable in operative position with each other, an adjustable keyboard mechanism serving under different conditions of adjustment to effect the release of corresponding matrices from the respective magazines, and unitary means for effecting simultaneously the required interchange of the distributor bars and magazine entrances as well as the required adjustment of the keyboard mechanism.

42. In a typographical composing and distributing machine adapted to be equipped with interchangeable matrix magazines, the combination of two distributor bars differing as to form to correspond to the respective magazines and movably mounted so as to be interchangeable in operative position with each other, an assembler entrance provided with two distinct throat sections equipped with differently located fixed partition plates to correspond to the respective magazines and movably mounted so as to be interchangeable in operative position with each other, and an adjustable keyboard mechanism serving under different conditions of adjustment to effect the release of corresponding matrices from the respective magazines.

43. In a typographical composing and distributing machine adapted to be equipped with interchangeable matrix magazines, the combination of two distributor bars differing as to form to correspond to the respective magazines and movably mounted so as to be interchangeable in operative position with each other, an assembler entrance provided with two throat sections also differing as to form to correspond to the respective magazines and movably mounted so as to be interchangeable in operative position with each other, an adjustable keyboard mechanism serving under different conditions of adjustment to effect the release of corresponding matrices from the respective magazines, and means to ensure the corresponding interchange of the distributor bars and throat sections as well as the corresponding adjustment of the keyboard mechanism.

44. In a typographical composing and distributing machine adapted to be equipped with interchangeable matrix magazines, the combination of two distributor bars differing as to form to correspond to the respective magazines and movably mounted so as to be interchangeable in operative position with each other, an assembler entrance provided with two throat sections also differing as to form to correspond to the respective magazines and movably mounted so as to be interchangeable in operative position with each other, an adjustable keyboard mechanism serving under different conditions of adjustment to effect the release of corresponding matrices from the respective magazines, and unitary means for effecting simultaneously the required interchange of the distributor bars and throat sections as well as the required adjustment of the keyboard mechanism.

45. In a typographical composing and distributing machine adapted to be equipped with interchangeable matrix magazines, the combination of two magazine entrances differing as to form to correspond to the respective magazines and movably mounted so as to be interchangeable in operative position with each other, an assembler entrance provided with two throat sections also differing as to form to correspond to the respective magazines and movably mounted so as to be interchangeable in operative position with each other, and an adjustable keyboard mechanism serving under different conditions of adjustment to effect the release of corresponding matrices from the respective magazines.

46. In a typographical composing and distributing machine adapted to be equipped with interchangeable matrix magazines, the combination of two magazine entrances differing as to form to correspond to the respective magazines and movably mounted so as to be interchangeable in operative position with each other, an assembler entrance provided with two throat sections also differing as to form to correspond to the respective magazines and movably mounted so as to be interchangeable in operative position with each other, an adjustable keyboard mechanism serving under different conditions of adjustment to effect the release of corresponding matrices from the respective magazines, and means to ensure the corresponding interchange of the magazine entrances and throat sections as well as the corresponding adjustment of the keyboard mechanism.

47. In a typographical composing and distributing machine adapted to be equipped with interchangeable matrix magazines, the combination of two magazine entrances differing as to form to correspond to the respective magazines and movably mounted so as to be interchangeable in operative position with each other, an assembler entrance provided with two throat sections also differing as to form to correspond to the respective magazines and movably mounted so as to be interchangeable in operative position with each other, an adjustable keyboard mechanism serving under different conditions of adjustment to effect the release of corresponding matrices from the respective magazines, and unitary means for effecting simultaneously the required interchange of the magazine entrances and throat sections as well as the required adjustment of the keyboard mechanism.

48. In a typographical composing and distributing machine adapted to be equipped with interchangeable matrix magazines, the combination of two magazine entrances differing as to form to correspond to the respective magazines and movably mounted so as to be interchangeable in operative position with each other, an assembler entrance provided with two throat sections also differing as to form to correspond to the respective magazines and movably mounted so as to be interchangeable in operative position with each other, two distributor bars likewise differing as to form to correspond to the respective magazine entrances and movably mounted for interchange, and an adjustable keyboard mechanism serving under different conditions of adjustment to effect the release of corresponding matrices from the respective magazines.

49. In a typographical composing and distributing machine adapted to be equipped with interchangeable matrix magazines, the combination of two magazine entrances differing as to form to correspond to the respective magazines and movably mounted so as to be interchangeable in operative position with each other, an assembler entrance provided with two throat sections also differing as to form to correspond to the respective magazines and movably mounted so as to be interchangeable in operative position with each other, two distributor bars likewise differing as to form to correspond to the respective magazine entrances and movably mounted for interchange, an adjustable keyboard mechanism serving under different conditions of adjustment to effect the release of corresponding matrices from the respective magazines, and means to ensure the corresponding interchange of the magazine entrances, throat sections and distributor bars, as well as the corresponding adjustment of the keyboard mechanism.

50. In a typographical composing and distributing machine adapted to be equipped with interchangeable matrix magazines, the combination of two magazine entrances differing as to form to correspond to the respective magazines and movably mounted so as to be interchangeable in operative position with each other, an assembler entrance provided with two throat sections also differing as to form to correspond to the respective magazines and movably mounted so as to be interchangeable in operative position with each other, two distributor bars likewise differing as to form to correspond to the respective magazine entrances and movably mounted for interchange, an adjustable keyboard mechanism serving under different conditions of adjustment to effect the release of corresponding matrices from the respective magazines, and unitary means for effecting simultaneously the required interchange of the magazine entrances, throat sections and distributor bars, as well as the required adjustment of the keyboard mechanism.

51. In a typographical composing and distributing machine adapted to be equipped with interchangeable magazines, one containing a set of matrices occupying certain channels according to character, and the other containing a set of matrices occupying differently located channels according to character, the combination of a distributing mechanism adjustable to cooperate with the matrices of the magazine in use, a keyboard mechanism adjustable to connect the finger keys to the appropriate channels of that magazine, and means to ensure the corresponding adjustment of said distributing and keyboard mechanisms.

52. In a typographical composing and distributing machine adapted to be equipped with interchangeable magazines, one containing a set of matrices occupying certain channels according to character, and the other containing a set of matrices occupying differently located channels according to character, the combination of a distributing mechanism adjustable to cooperate with the matrices of the magazine in use, a keyboard mechanism adjustable to connect the finger keys to the appropriate channels of that magazine, and means for effecting simultaneously the required adjustment of the distributing and keyboard mechanisms.

53. In a typographical composing machine adapted to be equipped with interchangeable magazines, one containing a set of matrices occupying certain channels according to character, and the other containing a set of matrices occupying differently located channels according to character, the combination of assembling mechanism adjustable to cooperate with the matrices of the magazine in use, a keyboard mechanism adjustable to connect the finger keys to the appropriate channels of that magazine, and means to ensure the corresponding adjustment of the assembling and keyboard mechanisms.

54. In a typographical composing machine adapted to be equipped with interchangeable magazines, one containing a set of matrices occupying certain channels according to character, and the other containing a set of matrices occupying differently located channels according to character, the combination of assembling mechanism adjustable to cooperate with the matrices of the magazine in use, a keyboard mechanism adjustable to connect the finger keys to the appropriate channels of that magazine, and unitary means for effecting simultaneously the required adjustment of the assembling and keyboard mechanisms.

55. In a typographical composing and distributing machine adapted to be equipped with interchangeable magazines, one containing a set of matrices occupying certain channels according to character, and the other containing a set of matrices occupying differently located channels according to character, the combination of a distributing mechanism adjustable to cooperate with the matrices of the magazine in use, an assembling mechanism likewise adjustable to cooperate with the matrices of the magazine in use, a keyboard mechanism adjustable to connect the finger keys to the appropriate channels of that magazine, and means to ensure the corresponding adjustment of the distributing, assembling and keyboard mechanisms.

56. In a typographical composing and distributing machine adapted to be equipped with interchangeable magazines, one containing a set of matrices occupying certain channels according to character, and the other containing a set of matrices occupying differently located channels according to character, the combination of a distributing mechanism adjustable to cooperate with the matrices of the magazine in use, an assembling mechanism likewise adjustable to cooperate with the matrices of the magazine in use, a keyboard mechanism adjustable to connect the finger keys to the appropriate channels of that magazine, and unitary means for effecting simultaneously the required adjustment of the distributing, assembling and keyboard mechanisms.

57. In a typographical distributing machine, the combination of two matrix magazines movably mounted for interchange in operative position with each other, two distributor bars also movably mounted for interchange in operative position with each other, and means to ensure the corresponding interchange of the magazines and distributor bars.

58. In a typographical distributing machine, the combination of two matrix magazines movably mounted for interchange in operative position with each other, two magazine entrances also movably mounted for interchange in operative position with each other, and means to ensure the corresponding interchange of the magazines and magazine entrances.

59. In a typographical composing machine, the combination of two matrix magazines movably mounted for interchange in operative position with each other, an assembler entrance provided with two throat sections also movably mounted for interchange in operative position with each other, and means to ensure the corresponding interchange of the magazines and throat sections.

60. In a typographical composing machine, the combination of two matrix magazines movably mounted for interchange in operative position with each other, an adjustable keyboard mechanism serving under different conditions of adjustment to effect the release of corresponding matrices from the respective magazines, and means to ensure the corresponding interchange and adjustment of the magazines and keyboard mechanism, respectively.

61. In a typographical distributing machine, the combination with two interchangeable magazines, two interchangeable distributor bars, and two interchangeable magazine entrances, of means to ensure the corresponding interchange of all of said elements.

62. In a typographical composing machine, the combination with two interchangeable magazines, an assembler entrance provided with two interchangeable throat sections, and an adjustable keyboard mechanism, of means to ensure the corresponding interchange of the magazines and throat sections as well as the corresponding adjustment of the keyboard mechanism.

63. In a typographical composing and distributing machine, the combination with two interchangeable magazines, two interchangeable distributor bars, two interchangeable magazine entrances, an assembler entrance provided with two interchangeable throat sections, and an adjustable keyboard mechanism, of means to ensure the corresponding interchange of the magazines, distributor bars, magazine entrances and throat sections, as well as the corresponding adjustment of the keyboard mechanism.

64. In a typographical composing machine, the combination with two matrix magazines movably mounted for interchange in operative position with each other, and assembling mechanism adjustable to cooperate with the magazine in use, of means to ensure the corresponding interchange and adjustment of the magazines and assembling mechanism, respectively.

65. In a typographical composing machine, the combination with two differently channeled matrix magazines movably mounted for interchange in operative position with each other, means for effecting such interchanging movement of the magazines, a keyboard mechanism adjustable to connect the finger keys to the appropriate channels of the magazine in use, and means for effecting such adjustment of the keyboard, of connections between the two said means to ensure the corresponding interchange and adjustment of the magazines and keyboard mechanism, respectively.

66. In a typographical distributing machine, the combination with two differently channeled matrix magazines movably mounted for interchange in operative position with each other, means for effecting such interchanging movement of the magazines, a distributing mechanism adjustable to cooperate with the magazine in use, and means for effecting such adjustment of the distributing mechanism, of connections between the two said means to ensure the corresponding interchange and adjustment of the magazines and distributing mechanism, respectively.

67. In a typographical composing machine, the combination with two differently channeled matrix magazines movably mounted for interchange in operative position with each other, means for effecting such interchanging movement of the magazines, assembling and distributing mechanisms adjustable to cooperate with the magazine in use, and separate means for effecting such adjustment of the assembling and distributing mechanisms, of connections between the several said means to ensure the corresponding interchange and adjustment of the magazines and assembling and keyboard mechanisms, respectively.

68. In a typographical composing and distributing machine, the combination with two differently channeled matrix magazines movably mounted for interchange in operative position with each other, means for effecting such interchanging movement of the magazines, distributing, assembling and keyboard mechanisms adjustable to cooperate with the magazine in use, and means for effecting such adjustment of the distributing, assembling and keyboard mechanisms, of connections between the several said means to ensure the corresponding interchange and adjustment of the magazines and distributing, assembling and keyboard mechanisms, respectively.

69. In a typographical distributing machine, the combination of two independently mounted magazine entrances interchangeable in operative position with each other, and unitary means for effecting such interchange.

70. In a typographical distributing machine, the combination of two swinging magazine entrances mounted on independent axes for interchange in operative position with each other, and means operable to swing either entrance out of operative position and the other into such position, when required.

In testimony whereof, I have affixed my signature hereto.

JOHN R. ROGERS.